United States Patent
Voronov

(10) Patent No.: US 8,525,136 B2
(45) Date of Patent: *Sep. 3, 2013

(54) WORK PIECE WITH CONCEALED SURFACE DEFECTS

(75) Inventor: Sergei Voronov, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 13/088,861

(22) Filed: Apr. 18, 2011

(65) Prior Publication Data

US 2011/0195226 A1    Aug. 11, 2011

Related U.S. Application Data

(63) Continuation of application No. 12/317,523, filed on Dec. 24, 2008, now Pat. No. 7,985,957.

(51) Int. Cl.
*G21K 5/10* (2006.01)
*D06N 7/04* (2006.01)

(52) U.S. Cl.
USPC ............ 250/492.22; 250/492.1; 428/141; 428/400; 428/543; 428/919

(58) Field of Classification Search
USPC ...... 250/492.1, 492.2, 492.22, 526; 428/141, 428/155, 187, 192, 400, 543, 919; 148/516, 148/525, 565

See application file for complete search history.

(56) References Cited

U.S. PATENT DOCUMENTS

| | | | |
|---|---|---|---|
| 7,807,573 B2 | 10/2010 | Li et al. | |
| 7,985,957 B2 | 7/2011 | Voronov | |
| 2005/0244307 A1* | 11/2005 | Gygax et al. | 422/124 |
| 2006/0148802 A1* | 7/2006 | Haning et al. | 514/246 |
| 2006/0213884 A1* | 9/2006 | Chen | 219/121.74 |
| 2008/0156780 A1 | 7/2008 | Voronov et al. | |
| 2008/0216926 A1* | 9/2008 | Guo et al. | 148/565 |
| 2008/0299408 A1* | 12/2008 | Guo et al. | 428/573 |
| 2009/0084956 A1 | 4/2009 | Gat | |
| 2010/0065971 A1 | 3/2010 | Li et al. | |
| 2010/0099238 A1 | 4/2010 | Vakanas et al. | |
| 2010/0129984 A1 | 5/2010 | Vakanas et al. | |
| 2010/0155625 A1 | 6/2010 | Voronov | |
| 2011/0256513 A1* | 10/2011 | Levitt et al. | 434/185 |
| 2012/0134025 A1* | 5/2012 | Hart | 359/601 |

* cited by examiner

*Primary Examiner* — Bernard E Souw

(74) *Attorney, Agent, or Firm* — Winkle, PLLC

(57) ABSTRACT

Methods for concealing random or uncontrolled surface defects from a work piece surface are provided, by applying a plurality of induced controlled defects over the random defects to alter the surface texture.

20 Claims, 3 Drawing Sheets

WORK PIECE WITH CONCEALED SURFACE DEFECTS

CROSS REFERENCE TO RELATED APPLICATION:

This application is a continuation application of U.S. patent application Ser. No. 12/317,523 filed Dec. 24,2008.

BACKGROUND

1. Technical Field

Embodiments of the invention relate generally to the field of semiconductor technology and, more particularly, to concealment of surface defects using laser ablation methods.

2. Description of Related Art

A key requirement for microelectronics products, such as processor dice, intended for the consumer sector is the visual appearance of the products to be marketed. Very often, consumers place equal importance on the performance as well as the appearance of the products. Surface defects that are clearly distinguishable may impair a consumer's perception of the product's performance, thereby leading to a possible loss of sales.

Surface defects may be introduced at various stages of the semiconductor manufacturing and assembly process. For example, etch pits may appear on the backside surface of a silicon wafer after micro-fabrication processes such as etching. Scratch marks may be introduced to die back side and edge at the sorting stage. Scuff marks may be introduced to the back side metallization (BSM) layer deposited on a bare die at a die-level-cherry-picking (DLCP) testing stage. These, and other various processes, increase surface defects, resulting in an average yield loss of around 1% to around 3%.

Current methods for concealing the visual defects from semiconductor assemblies include grinding the backside surface of the silicon wafer prior to deposition of a BSM layer, and roughening or polishing a die package surface at pre/post testing stage. These methods, however, are unable to provide satisfactory concealment of all the surface defects. For example, grinding may remove defects introduced during fabrication stage but may not conceal defects introduced during testing stage at End of Line (EOL). In view of the foregoing problems, improved methods for concealing surface defects from the semiconductor assemblies are desired.

BRIEF DESCRIPTION OF THE DRAWINGS

Embodiments of the invention are disclosed hereinafter with reference to the drawings, in which.

DETAILED DESCRIPTION

Figure 1:
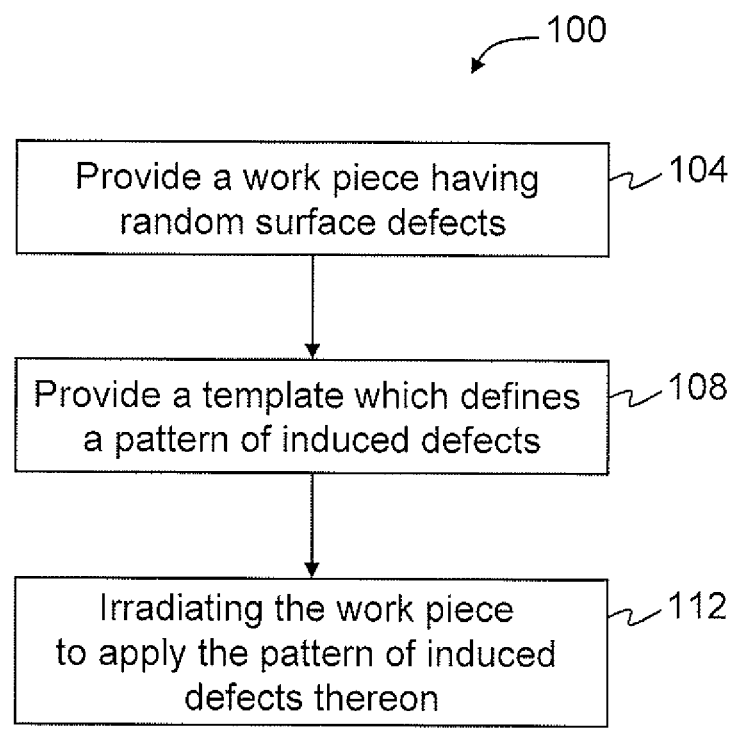
FIG. 1 is a flow sequence illustrating a method of concealing random surface defects according to one embodiment of the invention.

In the following description, numerous specific details are set forth in order to provide a thorough understanding of various illustrative embodiments of the invention. It will be understood, however, to one skilled in the art, that embodiments of the invention may be practiced without some or all of these specific details. In other instances, well known process operations have not been described in detail in order not to unnecessarily obscure pertinent aspects of embodiments being described. In the drawings, like reference numerals refer to same or similar functionalities or features throughout the several views.

FIG. 1 is a flow sequence 100 for a method of concealing surface defects according to one embodiment of the invention. The flow sequence 100 will be described with further reference to FIGS. 2A to 2C illustrating various process outputs obtained during the flow sequence 100 of FIG. 1.

Figure 2A:
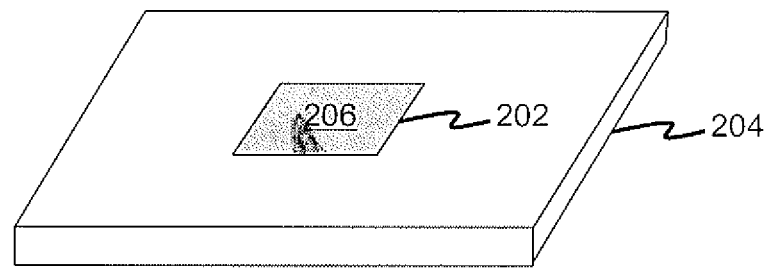
FIGS. 2A to 2C illustrate various process outputs obtained during the flow sequence of FIG. 1.
Figure 2B:
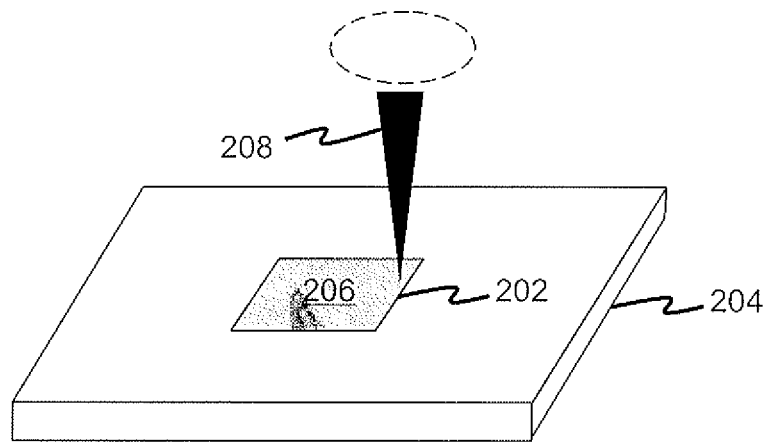
Figure 2C:
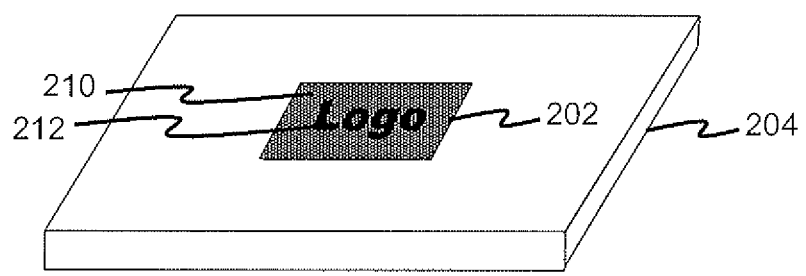

The flow sequence 100 begins with providing a work piece having random uncontrolled surface defects (block 104, FIG. 2A). Examples of a work piece include, but are not limited to, a semiconductor die 202 and an integrated heat spreader. In the present disclosure, the work piece is referred to as a semiconductor die 202 for illustration purposes. It is to be understood that the flow sequence 100 is applicable to other parts of a semiconductor package with suitable modifications. Examples of these other parts include, but are not limited to, die singulation edge, die corners, front side of the die along a perimeter of the singulation edge, solder resist material on semiconductor substrate, and Die Attach Film (DAF) placed on a die back surface.

The semiconductor die work piece 202 may be attached to a supporting substrate 204 (see FIG. 2A). The semiconductor die 202 may or may not include a back side metallization (BSM) layer on the die back surface 206 having random or uncontrolled surface defects introduced thereon during various fabrication and manufacturing processes.

The flow sequence 100 may then proceed with providing a template which defines a pattern of induced controlled defects to be applied onto the die back surface 206 (block 108). The pattern of induced defects, e.g. pits 210, cavities, may be customized or predetermined. For example, the pattern may be a uniform array of pits 210 or cavities to overlay a substantial portion or an entire portion of the die back surface 206 to conceal the random defects. It follows that a surface area formed by the induced defects is therefore likely to be greater than a surface area formed by the random surface defects. When this pattern becomes applied to approximately the entire die back surface 206, the pattern will appear as a blanket mark from which no text or image is discernible (see FIG. 3A). In another example, the pattern may be an array of pits 210 to overlay one or more selected portions of the die back surface 206. When this pattern becomes applied to the selected portions, a first region having the induced defects can be distinguished from a second region which is substantially free of induced defects. The first and the second regions are juxtaposed in cooperation to provide a visual representation 212 of a text and/or an image (see FIG. 3C). The visual representation 212 may be a logo or an identifier desired to be applied onto the die back surface 206.

The template may be provided as an electronic file or other suitable forms to an apparatus for applying the induced defects to conceal random defects. In the present disclosure, such an apparatus is referred to as a laser marking system, but it is to be understood that other apparatus may be used with suitable modifications. The laser marking system may provide pulsed excimer or solid-state lasers having wavelengths of between about 193 nanometers (nm) to 1064 nm at a laser pulse repetition rate of 1 to about 80000 kilo-Hertz (kHz). It is to be understood that the wavelength and laser repetition rate to be utilized may be varied depending on requirements.

For example, to improve the concealment of random defects, a smaller or shorter laser wavelength may be used to increase pit density (number of pits per unit area) as well as to achieve smaller ablation depth. A longer laser wavelength may be used to decrease pit density but enhance surface melting and re-solidification effect. The laser marking system may be equipped with galvanometer steering mirrors and lenses for focusing the laser beams on a work piece surface. The laser marking system may be equipped or coupled to a computing device to receive process and/or execute the template defining the pattern of induced defects. It is also to be understood that other laser marking system may be used with suitable modifications.

The flow sequence then proceeds with irradiating the die back surface 206 with laser pulses 208 to apply a pattern of induced defects, e.g. pits 210, overlaying the random defects (block 112, FIG. 2B). The pattern of induced defects depends on the template provided earlier (in block 108). The laser pulses 208 may be provided as one pass of individual laser spots organized side-by-side to cover the die back surface 206. Galvanometer mirrors and focusing lens may be provided in the laser marking system to focus the laser beams on the die back surface 206. The laser beams may be programmed to switch on and to switch off so that the pattern provided in the template is applied to the die back surface 206. Other ways of providing the laser pulses 208 may be envisaged.

The flow sequence 100 may be performed after testing procedures at the End-Of-Line (EOL) prior to quality inspection to camouflage visual surface defects that are introduced during fabrication stage (e.g. silicon etching), wafer handling during sorting stage, and during testing stage.

Figure 3A:
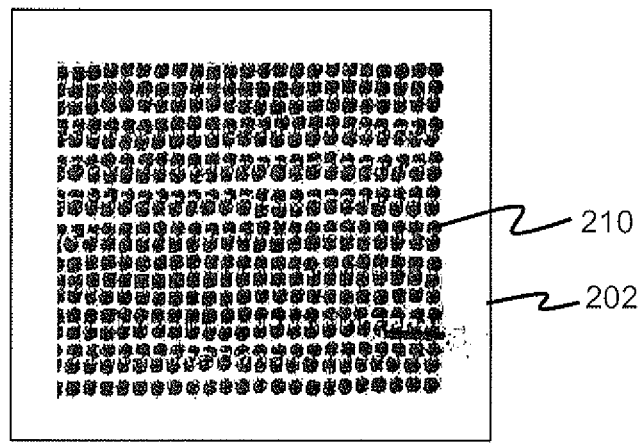
FIG. 3A is a low magnification scanning electron microscopy (SEM) image of laser pits on a die back side surface obtained using the flow sequence of FIG. 1.
Figure 3B:
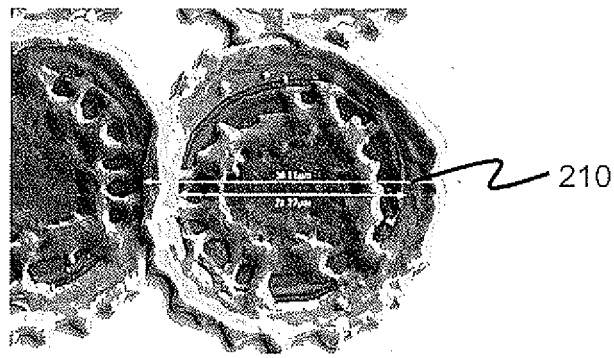
FIG. 3B is a high magnification SEM image of some of the laser pits of FIG. 3A.

FIG. 3A is a low magnification scanning electron microscopy (SEM) image of laser pits 210 overlaying a substantial portion of a die back surface 206. In the example of FIG. 3A, a substantial portion of the die back surface 206 is marked by laser pulses 208 to form a uniform array of juxtaposed laser pits 210 to appear as a blanket mark on the die back surface 206. FIG. 3B is a high magnification SEM image of some of the laser pits 210 of FIG. 3A. It should be appreciated from FIG. 3B that the pits 210 are formed by ablating material or by redistributing a thin layer of material of the die back surface 206 with little debris precipitation. With the formation of the pits 210, the texture (or surface roughness) of the die back surface 206 is altered or modulated. The surface texture alteration, together with the juxtaposed arrangement of the pits 210, conceals or camouflages any underlying random surface defects. In the example of FIG. 3B, the ablation depth of pits 210 is about 1 micron and the diameter is about 30 microns (µm). It is to be understood that other ablation depth and pit diameter are possible depending on requirements. Pit depth and planar size depend on laser wavelength and type of controlled defects introduced onto the surface: either ablation of the surface material or surface material redistribution by melting and solidification.

Figure 3C:
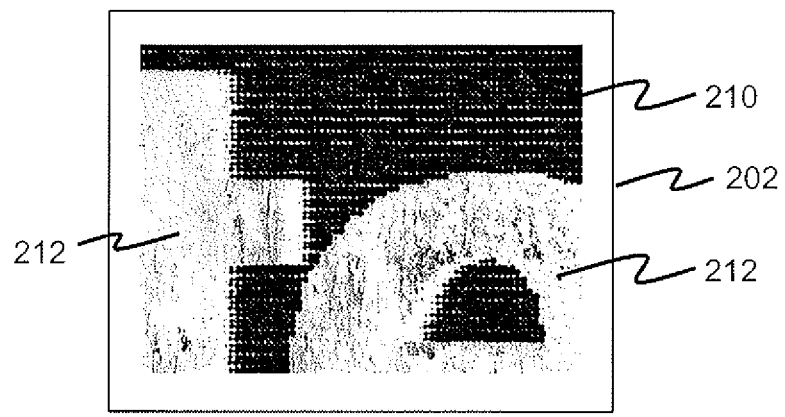
FIG. 3C is a low magnification image of laser pit regions in cooperation with pit-free regions to provide a visual representation.

FIG. 3C is a low magnification image of laser pits 210 juxtaposed in cooperation with pit-free regions to form a visual representation. In the example of FIG. 3B, selected portions of the die back surface 206 are marked by laser pulses 208 to form pits 210 while remaining portions of the die back surface 206 are unmarked. The unmarked portions are juxtaposed in cooperation with the marked portions to create a negative image (tonally-inversed image) to provide a visual representation, e.g. a text and/or image. The visual representation is useful if a logo or product identifier is desired to be applied on the semiconductor die 202. Further, the visual representation enhances the camouflaging effect to improve an overall appearance of the final product.

Embodiments of the invention are particularly useful in concealing random or uncontrolled surface defects by applying induced controlled surface defects. This improves the aesthetics of the finished product which in turn enhances a consumer's perception of the product's performance.

Other embodiments will be apparent to those skilled in the art from consideration of the specification and practice of the present invention. Furthermore, certain terminology has been used for the purposes of descriptive clarity, and not to limit the invention. The embodiments and features described above should be considered exemplary, with the invention being defined by the appended claims.

The invention claimed is:

1. An apparatus comprising a work piece having a pattern of induced defects on at least one surface thereof for concealing a previously existing random defect(s).

2. The apparatus of claim 1, wherein the work piece comprises a semiconductor die.

3. The apparatus of claim 1, wherein the work piece comprises a heat spreader.

4. The apparatus of claim 1, wherein the pattern of induced defects comprises a pattern of induced pits.

5. The apparatus of claim 4, the pattern of induced cavities comprise a pattern of laser induced pits.

6. The apparatus of claim 1, wherein the pattern of induced defects reside in a first region of the surface, and wherein a second region of the surface is substantially free of the pattern of induced defects.

7. The apparatus of claim 6, wherein the surface first region and the surface second region are juxtaposed to provide a visual representation.

8. The apparatus of claim 7, wherein the visual representation comprises text.

9. The apparatus of claim 7, wherein the visual representation comprises an image.

10. An apparatus formed by the method comprising:
applying a plurality of induced defects on a first portion of a surface of a work piece to conceal a plurality of random defects on the surface.

11. The apparatus of claim 10, wherein applying the plurality of induced defects comprises irradiating a first portion of the surface with a plurality of laser pulses to form a plurality of pits overlaying the random defects.

12. The apparatus of claim 10, wherein applying a plurality of induced defects on a first portion of a surface of a work piece comprises applying a plurality of induced defects on a first portion of a surface of a heat sink.

13. The apparatus of claim 10, wherein applying a plurality of induced defects on a first portion of a surface of a work piece comprises applying a plurality of induced defects on a first portion of a surface of a semiconductor die.

14. The apparatus of claim 10, wherein a second portion of the surface which is unexposed to the laser pulses is substantially defect-free to form a visual representation in cooperation with the induced defect.

15. The apparatus of claim 10, wherein a surface area formed by the induced defects is greater than a surface area formed by the random defects.

16. The apparatus of claim 10, wherein applying the plurality of induced defects further including: providing a template which defines an arrangement of the induced defects.

17. The apparatus of claim 16, wherein the template further defines a substantially induced defect-free region which forms a visual representation when juxtaposed in cooperation with the arrangement of the induced defects.

18. An apparatus formed by a method comprising: irradiating a surface of a work piece selected from an integrated heat sink and a semiconductor die with a plurality of laser pulses to form a plurality of pits on the surface, wherein the pits alter a texture of the surface, so as to conceal a previously existing random defect(s).

19. The apparatus of claim 18, further comprising: providing a template which defines an arrangement of the pits.

20. The apparatus of claim 19, wherein the template further defines a substantially pit-free region which forms a text or an image when juxtaposed in cooperation with the pits.

* * * * *